US006998735B2

(12) United States Patent
Gibbs

(10) Patent No.: US 6,998,735 B2
(45) Date of Patent: Feb. 14, 2006

(54) CONTROLLED RECTIFIER BRIDGE, CONTROL SYSTEM, AND METHOD FOR CONTROLLING RECTIFIER BRIDGE BY DISABLING GATE CONTROL SIGNALS

(75) Inventor: Irving A. Gibbs, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 548 days.

(21) Appl. No.: 10/281,701

(22) Filed: Oct. 28, 2002

(65) Prior Publication Data

US 2004/0080888 A1 Apr. 29, 2004

(51) Int. Cl.
*H02M 1/00* (2006.01)
(52) U.S. Cl. ............... 307/151; 307/127; 363/87
(58) Field of Classification Search ............... 363/87; 307/127, 151
See application file for complete search history.

(56) References Cited

U.S. PATENT DOCUMENTS

| 4,142,151 A | * | 2/1979 | Hansen ................. 324/767 |
| 4,633,241 A | * | 12/1986 | Casteel et al. ......... 340/645 |
| 5,963,440 A | | 10/1999 | Gibbs et al. |
| 5,963,441 A | | 10/1999 | Gibbs et al. |
| 6,046,917 A | | 4/2000 | Gibbs et al. |
| 6,208,120 B1 | | 3/2001 | Gibbs |
| 6,232,751 B1 | | 5/2001 | Farr et al. |
| 6,791,852 B1 | * | 9/2004 | Carter et al. ............ 363/57 |

OTHER PUBLICATIONS

"Active current balance between parallel thyristors in multi-bridge AC-DC rectifiers," Gibbs, I.A; Kimmel, D.S.; Energy Conversion, IEEE Transactions on vol. 16, Issue 4, Dec. 2001 pp. 334-339, Manuscript received Jun. 22, 2001.*

* cited by examiner

*Primary Examiner*—Brian Sircus
*Assistant Examiner*—Brett Squires
(74) *Attorney, Agent, or Firm*—Martin J. Moran

(57) ABSTRACT

A controlled rectifier bridge includes a plurality of segments each having an element responsive to a control signal, and an output having a voltage, a first current and a second current. Sensors provide sensed current values from first and second output currents from the bridge. A routine determines if the sensed current values are greater than a predetermined value. A regulator outputs the control signals to the segments in order to control current conduction within the segments. A routine determines if a circuit interrupter is open or if current is not flowing between bridge inputs and the corresponding alternating current phases. A routine disables the control signals to pairs of the segments when the sensed current values are greater than the predetermined value, and when the circuit interrupter is open or when current is not flowing between the inputs and the corresponding alternating current phases.

15 Claims, 4 Drawing Sheets

CONTROLLED RECTIFIER BRIDGE, CONTROL SYSTEM, AND METHOD FOR CONTROLLING RECTIFIER BRIDGE BY DISABLING GATE CONTROL SIGNALS

CROSS-REFERENCE TO RELATED APPLICATION

This application is related to commonly assigned, co-pending U.S. patent application Ser. No. 10/159,887, filed May 30, 2002, entitled "Control System Including Rectifier and Method for Controlling Rectifier Bridge by Disabling Gating of Semiconductor Device Based Upon Heat Sink or Junction Temperature".

BACKGROUND OF THE INVENTION

1. Field of the Invention

The present invention relates to control systems and, more particularly, to control of rectifiers employing semiconductor devices, such as silicon controlled rectifiers (SCRs) or thyristors. The invention also relates to a method for controlling a rectifier bridge.

2. Background Information

Three-phase rectifier circuits are commonly employed to convert AC signals to DC signals. These circuits often use SCRs disposed in bridge segments, with typically one SCR for each polarity of each AC phase. Typically, a bridge firing control circuit controls the firing point for each rectifier in each AC cycle. Examples of such circuits are disclosed in U.S. Pat. Nos. 5,963,440; 5,963,441; 6,046,917; 6,208,120; and 6,232,751.

It is not uncommon for a plurality of SCR bridges to be operated in parallel with each of the corresponding bridge firing control circuits being controlled by a central firing control circuit. The central firing control circuit manages each of the bridge firing control circuits in order that the corresponding rectifiers in each of the parallel bridges conduct current at the same point in the AC waveform.

SCR bridges are commonly employed in an excitation control system to provide field excitation for a rotating electrical apparatus (e.g., large synchronous generators and motors, utility synchronous generators and motors, industrial synchronous motors and generators, synchronous generators and motors for naval or other shipping applications, synchronous generators and motors for oil well drilling rigs).

Traditionally, fuses are employed in series with each one of the semiconductor devices (e.g., six total thyristors or SCRs) in a full-wave (e.g., six-pulse) bridge, in order to protect the bridge and the semiconductor devices from faults. A bridge converter may include two or more parallel bridges. Each one of these bridges is configured in parallel with the other one or more bridges, in order that they share the load current. Furthermore, one or two fuses may be employed between the DC output of each one of the bridges and the load.

Using only AC line fuses (e.g., three total for a three-phase power source) on converter bridges reduces the number of fuses required and generally protects both the AC bus and the DC bus. However, other problems may result.

When the load is inductive, the instantaneous output of the bridge (i.e., the load voltage) may be negative during certain intervals (although the load current is generally constant through the inductive load). If AC line fuses are employed, and if a semiconductor device (e.g., thyristor) is shorted (i.e., failed), then a path for current is provided through the shorted thyristor when the conjugate (i.e., series) thyristor is gated. This is because the negative voltage may be present across the load and, hence, current would then flow through the shorted thyristor when the conjugate thrysitor is fired. This is unacceptable because continued operation may result in the conjugate thyristor failing if it carries too much current. Also, the converter bridge cannot develop full negative voltage.

Accordingly, there is room for improvement in controlled rectifier bridges, control systems, and methods for controlling rectifier bridges.

SUMMARY OF THE INVENTION

These needs and others are met by the present invention, which disables control signals to elements or semiconductor devices, such as a thyristors or SCRs, of a rectifier bridge. This is accomplished by detecting an open circuit interrupter, such as an AC line fuse, for a particular rectifier bridge and, then, responsively removing control signals from two series elements (e.g., a potentially shorted thyristor and the conjugate (series) thyristor). This solves the problem of the potentially shorted thyristor because the conjugate thyristor remains in a blocking state and does not allow conduction. Hence, such conjugate thyristor does not overheat.

The invention disables the control signals to the two elements, which are fed by a corresponding circuit interrupter, such as an AC line fuse, when either one of those two elements is shorted. The fuse may open, for example, in response to an output short circuit condition, a defective thyristor, or an overheated thyristor. This removes the path for current through the conjugate element, which is in series with the shorted element, and allows the rectifier bridge or converter to maintain its normal output.

As one aspect of the invention, a controlled rectifier bridge converts a plurality of alternating current voltages from a plurality of alternating current phases to a voltage, each of the alternating current phases has a positive polarity and a negative polarity, the controlled rectifier bridge comprises: a plurality of segments, each of the segments having an element responsive to a control signal; an output having the voltage, a first current and a second current; at least one sensor providing at least one sensed current value from the first current or the second current of the output; means for determining if the at least one sensed current value is greater than a predetermined value; means for outputting the control signals to the segments in order to control current conduction within the segments; and for each of the alternating current phases: an input electrically interconnected with a corresponding one of the alternating current phases, a circuit interrupter electrically connected in series with the input, a first one of the segments for the positive polarity of the corresponding one of the alternating current phases, a second one of the segments for the negative polarity of the corresponding one of the alternating current phases, the second one of the segments for the negative polarity of the corresponding one of the alternating current phases in series with the first one of the segments for the positive polarity of the corresponding one of the alternating current phases, means for determining if the circuit interrupter is open or if current is not flowing between the input and the corresponding one of the alternating current phases, and means for disabling the control signals to the first one and the second one of the segments when the at least one sensed current value is greater than the predetermined value, and when the circuit interrupter is open or when current is not flowing between the input and the corresponding one of the alternating current phases.

As another aspect of the invention, a method controls a rectifier bridge to convert a plurality of alternating current voltages from a plurality of alternating current phases to a voltage, each of the alternating current phases has a positive polarity and a negative polarity, the rectifier bridge includes a plurality of segments, each of the segments has an element responsive to a control signal, the rectifier bridge also includes an output having the voltage, a first current, a second current, and, for each of the alternating current phases, an input electrically interconnected with a corresponding one of the alternating current phases, a circuit interrupter electrically connected in series with the input, a first one of the segments for the positive polarity of the corresponding one of the alternating current phases, and a second one of the segments for the negative polarity of the corresponding one of the alternating current phases, the second one of the segments for the negative polarity of the corresponding one of the alternating current phases in series with the first one of the segments for the positive polarity of the corresponding one of the alternating current phases, the method comprises: sensing at least one sensed current value from the first current or the second current of the output; determining if the at least one sensed current value is greater than a predetermined value; outputting the control signals to the segments in order to control current conduction within the segments; determining if one of the circuit interrupters is open or if current is not flowing between the input and the corresponding one of the alternating current phases; and disabling the control signals to the first one and the second one of the segments responsive to: (a) the at least one sensed current value being greater than the predetermined value, and (b) the one of the circuit interrupters is open or current is not flowing between the input and the corresponding one of the alternating current phases.

As another aspect of the invention, a control system comprises: a first rectifier bridge; a second rectifier bridge; a circuit controlling the first and second rectifier bridges; each of the first and second rectifier bridges converting a plurality of alternating current voltages from a plurality of alternating current phases to a voltage, each of the alternating current phases having a positive polarity and a negative polarity, each of the first and second rectifier bridges comprises: a plurality of segments, each of the segments having an element responsive to a control signal; an output having the voltage, a first current and a second current; a first sensor providing a first sensed current value from the first current, a second sensor providing a second sensed current value from the second current, means for determining if the first sensed current value or the second sensed current value is greater than a predetermined value; means for outputting the control signals to the segments in order to control current conduction within the segments; and for each of the alternating current phases: an input electrically interconnected with a corresponding one of the alternating current phases, a circuit interrupter electrically connected in series with the input, a first one of the segments for the positive polarity of the corresponding one of the alternating current phases, a second one of the segments for the negative polarity of the corresponding one of the alternating current phases, the second one of the segments for the negative polarity of the corresponding one of the alternating current phases in series with the first one of the segments for the positive polarity of the corresponding one of the alternating current phases, means for determining if the circuit interrupter is open or if current is not flowing between the input and the corresponding one of the alternating current phases, and means for disabling the control signals to the first one and the second one of the segments when the first sensed current value or the second sensed current value is greater than the predetermined value, and when the circuit interrupter is open or when current is not flowing between the input and the corresponding one of the alternating current phases.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The present invention is described in association with a bridge rectifier for an excitation control system, although the invention is applicable to a wide range of controlled rectifier bridges, control systems and methods for controlling rectifier bridges.

Figure 1:
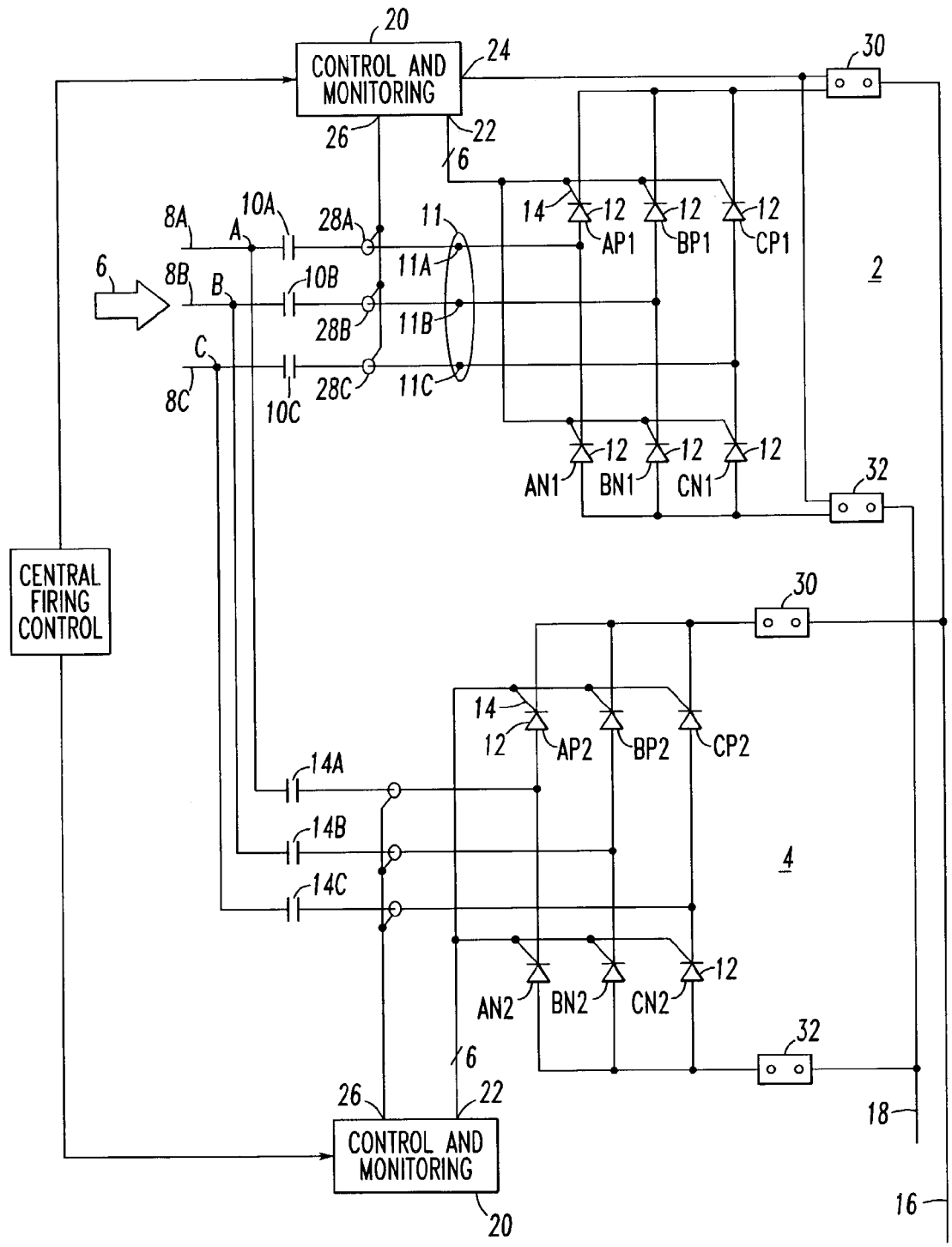
FIG. 1 is a circuit block diagram of two, three-phase, SCR bridges which are fed from a common three-phase source and are connected in parallel to provide an additive current output.

Bridges of semiconductor controlled rectifiers (SCRs) or thyristors are generally employed to convert alternating current (AC) sinusoidal signal waveforms to direct current (DC). As shown in FIG. 1, two controlled rectifier bridges 2,4 are connected in parallel. Each of the bridges 2,4 receives a multi-phase current input from a common AC source 6 (e.g., a motor generator, field transformer, power potential transformer (PPT)). A three-phase current input is employed in this example, although the invention is applicable to a wide range of phase counts. The several phases of input current, shown as 8A, 8B and 8C, are fed through contacts (e.g., circuit interrupter separable contacts; fuses) 10A, 10B and 10C, and 14A, 14B and 14C, respectively, to rectifying segments on the two respective bridges 2,4. As shown with the bridge 2, three inputs 11, including 11A, 11B,11C, are electrically interconnected with corresponding alternating current phases A,B,C by the contacts 10A,10B, 10C, respectively.

The exemplary bridges 2,4 each have six cells or segments, one for each polarity of each of the phase currents 8A,8B,8C, although the invention is applicable to a wide range of segment counts. For example, segment AP1 refers to the positive polarity of phase A in the first bridge 2, while segment AN1 refers to the negative polarity of phase A in that first bridge 2. The remaining segments of the first and second bridges 2,4 are noted in a similar manner by reference characters BP1,BN1,CP1,CN1 and AP2,AN2,BP2, BN2,CP2,CN2.

Each bridge segment includes its own element, such as the exemplary SCR 12, that has a firing input (or gate) 14. When a suitable control signal is provided to one of the inputs 14, the corresponding SCR fires to, thereby, control current conduction (e.g., by starting or initiating current conduction) within the corresponding segment. Typically, the individual segments of each of the bridges 2,4 are fired every 60° of the AC cycle in the order: APn,CNn,BPn,ANn,CPn,BNn (where, for convenience of reference, APn, for example, refers to either AP1 or AP2). One of the SCRs 12 does not stop conducting until it is reversed biased. All of the positive rectifier output currents are summed together and the negative rectifier output currents are similarly summed and conveyed by corresponding positive and negative conductors 16,18 to a load (not shown). Typically, the bridges 2,4 include one or more heat sinks (not shown) for the SCRs 12.

An exemplary microprocessor-based control and monitoring circuit 20 has six control outputs 22, which are interconnected with the six firing inputs 14 of the SCRs 12, for outputting control signals to the segments AP1,BP1,CP1, AN1,BN1,CN1 to control current conduction within those segments, and various monitoring inputs 24,26. The six control outputs 22 include six digital logic control signals each of which controls current conduction within a corresponding one of the segments. The circuit 20 employs a firing code that has six bits. Each of the six bits is set when a corresponding segment is to fire (e.g., bit 0 for APn, bit 1 for BPn, bit 2 for CPn, bit 3 for ANn, bit 4 for BNn, and bit 5 for CNn). Each time a firing occurs, two cells are fired. Also, a cell is usually fired a second time in order that the second firing occurs in the next subsequent firing (e.g., by first firing APn and CNn with the firing code=$100001_2$, followed by firing CNn and BPn with the firing code=$100010_2$).

Monitors 28A,28B,28C provide conduction monitor signals to the inputs 26 for the three AC phases A,B,C. The monitors 28A,28B,28C monitor the respective phases A,B,C to provide corresponding conduction signals. The control and monitoring circuits 20 also input current signals from the shunts 30,32 and use that information to control the output of the respective bridges 2,4 through DC contact actuators (not shown). As shown with the bridge 2, the shunt 30, a first current sensor, for the positive output of the bridge 2, senses current passing through the segments AP1,BP1, CP1 for the positive polarity of the AC phases A,B,C. Similarly, the shunt 32, a second current sensor, for the negative output of the bridge 2, senses current passing through the segments AN1,BN1,CN1 for the negative polarity of the AC phases A,B,C. In turn, the sensors 30,32 provide corresponding current signals to the two inputs 24 of the control and monitoring circuit 20.

As disclosed in U.S. Pat. No. 5,963,441, preferably, the monitors 28A,28B,28C are conduction monitors which output conduction monitor signals as four-state logic signals having a first state (e.g., $10_2$) representative of the positive polarity of the AC input current 8A,8B,8C; a second state (e.g., $01_2$) representative of the negative polarity of the AC input current; a third state (e.g., $00_2$) representative of about zero AC input current; and a fourth state (e.g., $11_2$) representative of failure of the monitor. Alternatively, the conduction monitors 28A,28B,28C are current sensing mechanisms, such as current transformers, which output a first state (e.g., a first range of positive values) of the conduction signal representative of the positive polarity of the AC input current, and a second state (e.g., a second range of negative values) of the conduction signal representative of the negative polarity of the AC input current. In this embodiment, a control and monitoring circuit (not shown) inputs the three analog conduction signals at the three corresponding inputs, converts those analog inputs to plural-bit digital form (e.g., through a suitable n-bit analog-to-digital converter), and then converts the digital representation of the analog conduction signal to the first state (e.g., $10_2$, which is representative of positive AC input current), the second state (e.g., $01_2$, which is representative of negative AC input current), or the third state (e.g., $00_2$, which is representative of about zero AC input current plus or minus a suitable deadband). It will be appreciated that since the exemplary control and monitoring circuit 20 for bridge 2 employs four-state logic signals, and need not perform analog-to-digital conversions, that a simpler and more economical circuit is possible. It will be appreciated that a wide range of alternative conduction monitors may be employed (e.g., a current sensor; a shunt with a suitable isolation device to provide a suitable sensed current value).

Figure 2:
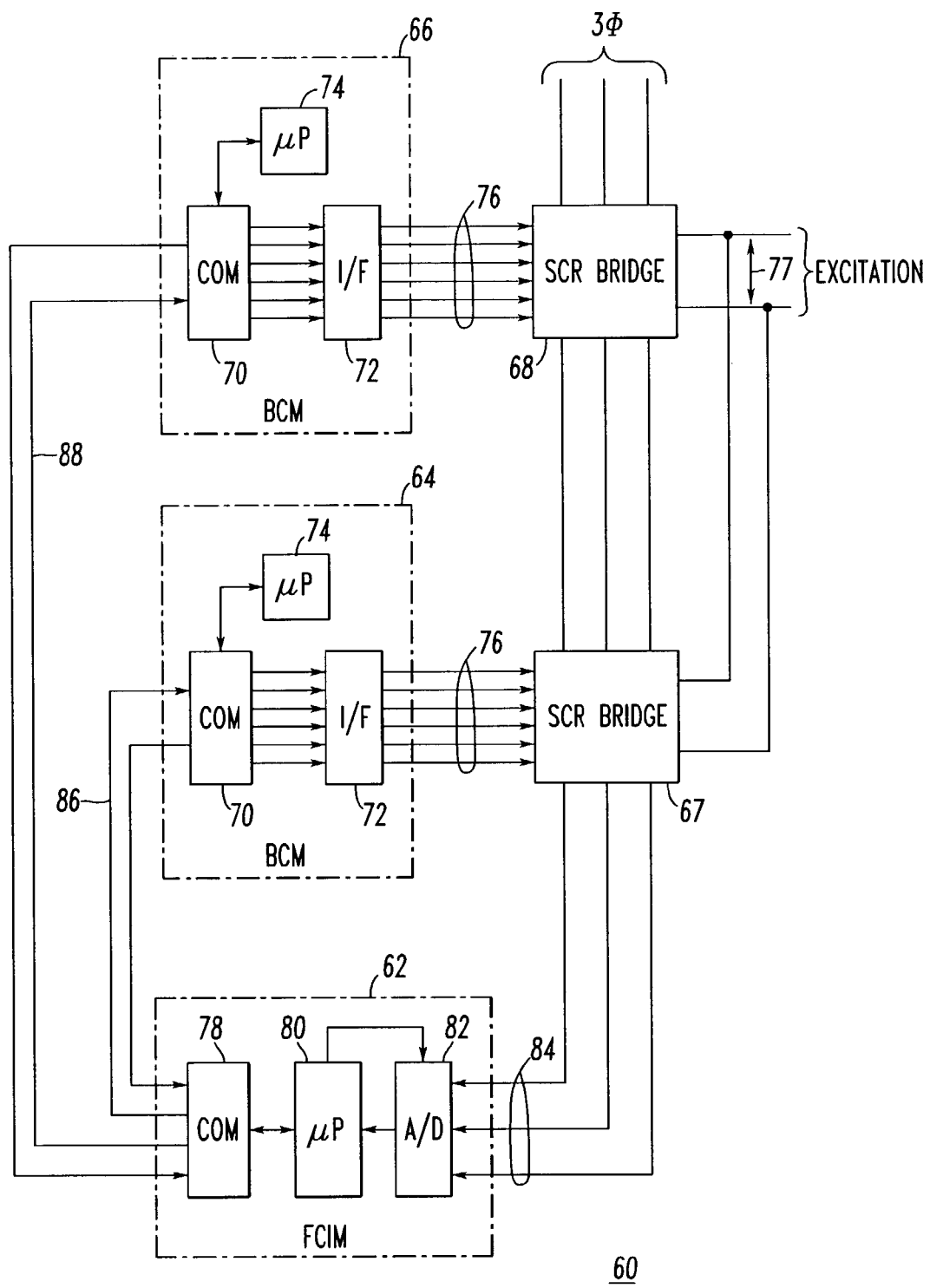
FIG. 2 is a block diagram of a firing control interface module (FCIM) and two bridge control modules (BCMs).

FIG. 2 is a block diagram of a control system 60 including a firing control interface module (FCIM) 62 and two bridge control modules (BCMs) 64,66 for respective SCR bridges 67,68. Each of the BCMs 64,66 includes a suitable communications interface (COM) 70, an interface (I/F) 72 to the corresponding bridge 67,68, and a suitable microprocessor ($\mu$P) 74. The COM 70 and $\mu$P 74 cooperate to send six exemplary firing pulses 76 to all of the segments in the corresponding bridge 67,68. The SCR bridges 67,68 output a rectified voltage 77.

The SCR bridge 67, for example, has its own BCM 64, which communicates with the FCIM 62. The FCIM 62 monitors the input voltage to the bridges 67,68 and also communicates with the other BCM 66. Although two exemplary bridges 67,68 are shown, one, three, or more parallel bridges may employed. It will be appreciated that the FCIM 62 controls and communicates with additional bridges in a similar manner.

The FCIM 62 includes a suitable communications interface (COM) 78, a suitable microprocessor ($\mu$P) 80, and an A/D converter 82 which samples the voltages of the three phases 84 through a suitable interface (not shown). The COM 78 of the FCIM 62 communicates with the COMs 70 of the BCMs 64,66 through suitable communication channels 86,88, respectively. In this manner, the FCIM 62 controls the BCMs 64,66 through the corresponding communication channels.

Figure 3:
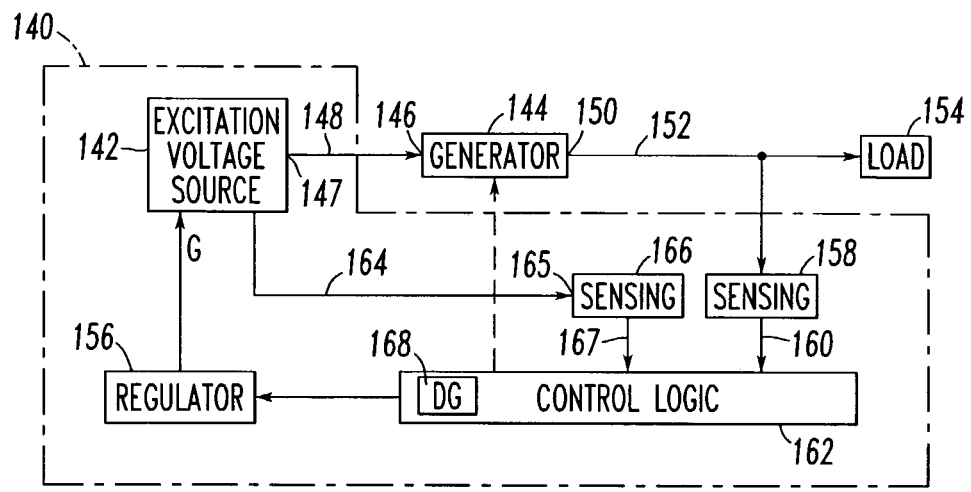
FIG. 3 is a block diagram of an excitation control system in accordance with the present invention.

FIG. 3 shows an excitation control system 140 including an excitation voltage source, such as a rectifier bridge 142. Examples of an excitation control system are disclosed in U.S. Pat. Nos. 6,208,120; and 6,232,751, which are incorporated by reference herein. The exemplary excitation control system 140 is for a rotating electrical apparatus, such as the exemplary generator 144. The generator 144 includes an input 146 responsive to an excitation voltage source output 147 having an excitation voltage 148, and an output 150 having one or more alternating current phases 152, each having a current flowing therein and a voltage, which supply power to a load 154. One or more circuit breakers (not shown) may be disposed between the generator 144 and the load 154. The excitation voltage source 142 provides the excitation voltage 148 to the input 146 of the generator 144. A regulator, such as a bridge control circuit 156 adapted to control the source 142, regulates the excitation voltage 148. A first sensing sub-system 158 for the alternating current phases 152 senses generator current and/or generator voltage and provides an electrical signal 160 (e.g., generator line current, generator watts) to control logic 162 for the regulator 156 and generator 144.

The excitation control system 140 employs the excitation voltage source 142, which in the exemplary embodiment is a three-phase rectifier circuit, to convert alternating current (AC) sinusoidal signal waveforms to direct current (DC). The three-phase rectifier circuit 142 includes a plurality of semiconductor devices, such as thyristors or SCRs. The semiconductor devices are disposed in bridge segments, with typically one thyristor or SCR for each polarity of each AC phase. The regulator 156 includes a bridge firing control circuit (not shown) to control the firing point for each thyristor or SCR in each AC cycle.

The excitation voltage source 142 has an AC input 164, which is connected to an input 165 of a suitable sensing circuit 166, which provides conduction monitor sensor signals 167 to the control logic 162. In accordance with the invention, a circuit (DG) 168 disables gating (G) of pairs of the semiconductor devices (e.g., AP1,AN1 of FIG. 1; 174, 182 of FIG. 4) when the output current of the excitation voltage source 142 is greater than a predetermined value, and when current is not flowing between the AC input 164 of the voltage source 142 and the corresponding AC phase (e.g., A,B,C of FIG. 1).

Figure 4:
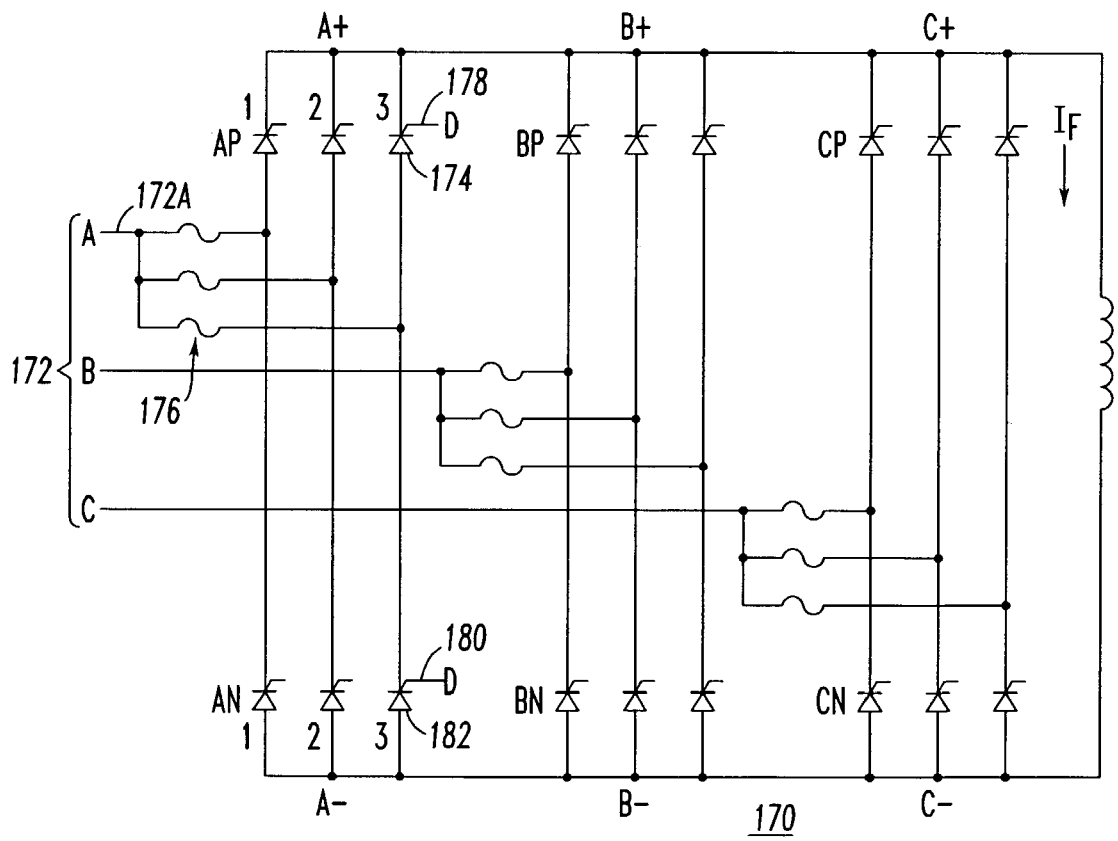
FIG. 4 is a block diagram of an excitation control system including a rectifier circuit in accordance with the present invention.

FIG. 4 shows a control system 170 including three-phase AC lines 172, and a converter including three rectifier bridges, each including six thyristors (i.e., 18 thyristors total) and three fuses (i.e., 9 fuses total). When a thyristor, such as AP3 174, shorts, the resulting fault current causes the corresponding circuit interrupter, such as fuse 176, to open. The present invention detects the open state of the fuse 176 (or the absence of current to or from, e.g., the AC line 172A) and responsively causes the gate control signals 178 and 180 to the thyristors AP3 174 and AN3 182, respectively, to be disabled (D). Hence, the thyristor anode-cathode voltage is blocked in both the forward and reverse directions at all times. This removes the freewheeling path (e.g., $I_F$) for current through the pair of thyristors 174,182. Furthermore, because the converter includes two or more bridges (e.g., three in this example), the proper DC output is maintained.

Figure 5:
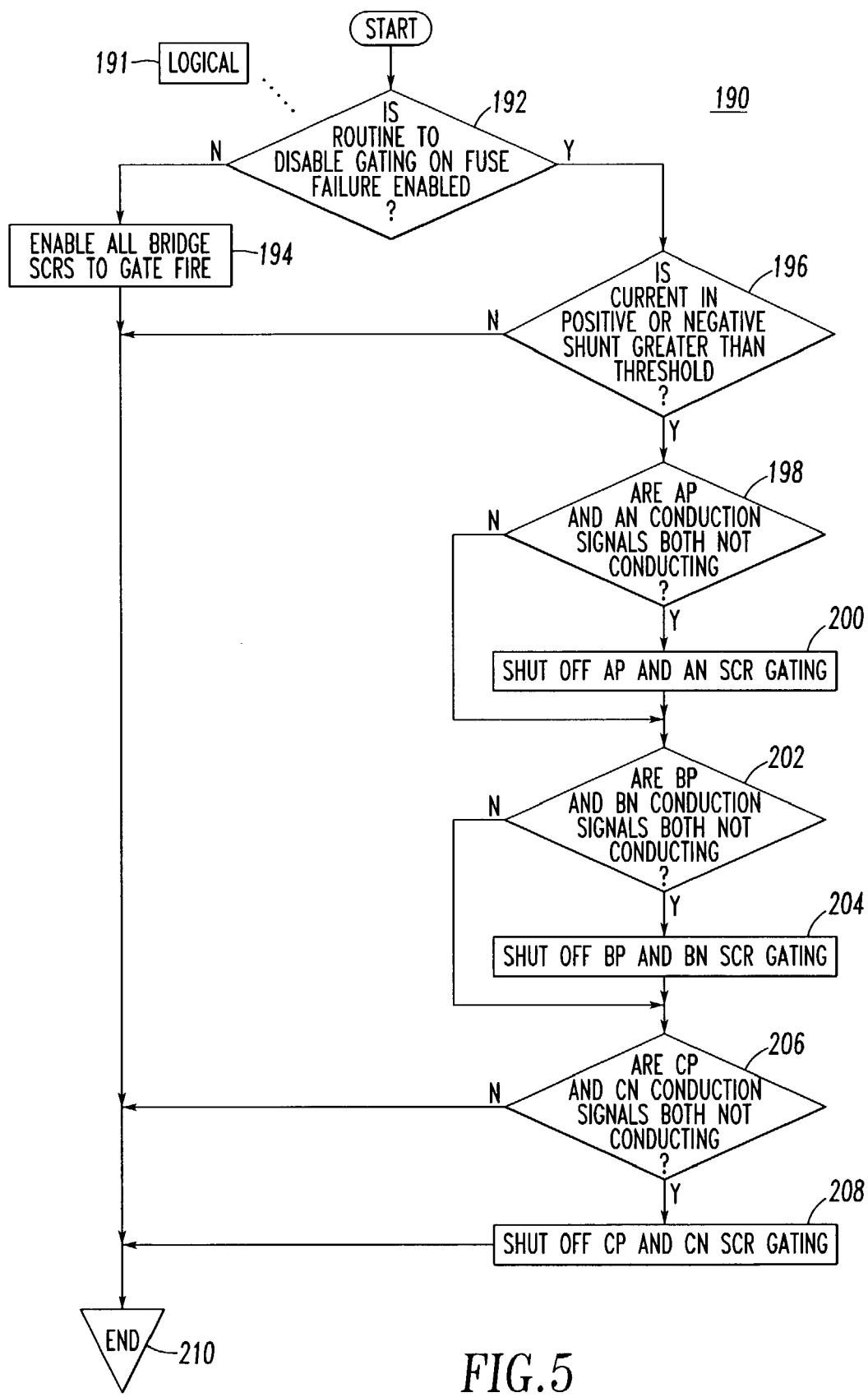
FIG. 5 is a block diagram of a routine employed for disabling gate control signals to a pair of thyristors in accordance with an embodiment of the invention.

FIG. 5 shows a routine 190 in accordance with the present invention for execution by the microprocessor of a bridge control module (e.g., 64 or 66 of FIG. 2). The routine 190 is enabled by a logical signal 191. When the logical signal 191 is "false," then all of the SCRs (e.g., 12 of FIG. 1) are enabled at 194. Preferably, the logical signal 191 is set "false" whenever the one or more bridges are shut down, and is set "true" (i.e., turned on), when the one or more bridges are turned back on.

On the other hand, if the logical signal 191 is "true" at 192, then even steps 196–208 determine whether conjugate pairs (e.g., AP1-AN1; BP1-BN1; CP1-CN1) of the SCRs are to be shut off or disabled. At 196, it is determined if the current in the positive shunt (e.g., 30 of FIG. 1) or the negative shunt (e.g., 32 of FIG. 1) is greater than a predetermined threshold. For example, the predetermined threshold may be 500 A and, depending upon the gain of the transducer, this could be an integer (e.g., 1000 counts). Preferably, the predetermined threshold may be adjusted to accommodate a wide range of converters and load applications. Preferably, the positive and negative shunt currents are filtered. A suitable adjustable filter (not shown) provides a suitable time constant (e.g., about 50 ms to about 100 ms). Normally, for a one-bridge system, these positive and negative shunt currents are equal. However, for a plural-bridge system, the positive shunt current may be different than the negative shunt current for a particular bridge.

If the current in the positive shunt or the (absolute value of the) current in the negative shunt is greater than the predetermined threshold at 196, then, at 198, it is determined if the AP and AN conduction signals are both not conducting. For example, the conduction monitor 28A of FIG. 1 may provide a state (e.g., $00_2$) representative of about zero AC input current through the circuit interrupter contact 10A. If so, then at 200, the gate control signals for both AP and AN SCRs are shut off or disabled. If not, or after 200, execution resumes at 202.

At 202, it is determined if the BP and BN conduction signals are both not conducting. For example, the conduction monitor 28B of FIG. 1 may provide a state (e.g., $00_2$) representative of about zero AC input current through the circuit interrupter contact 10B. If so, then at 204, the gate control signals for both BP and BN SCRs are shut off or disabled. If not, or after 204, execution resumes at 206.

At 206, it is determined if the CP and CN conduction signals are both not conducting. For example, the conduction monitor 28C of FIG. 1 may provide a state (e.g., $00_2$) representative of about zero AC input current through the circuit interrupter contact 10C. If so, then at 208, the gate control signals for both CP and CN SCRs are shut off or disabled. If not, or after 194 or 208, the routine 190 exits at 210. Preferably, the routine 190 is periodically executed (e.g., about every 1 ms), in order to provide continuous protection to the converter bridge.

There may be intervals when the two conduction monitor signals of any of the conduction monitors 28A,28B,28C may both not conduct in a bridge without a blown fuse or open circuit interrupter. For example, if skip fire is active in a bridge, then it is possible that CN and CP, or BN and BP, or AP and AN are not conducting. As a further example, a conduction monitor signal may be considered to be "not conducting" when it has missed conduction for a time period of several cycles. As a still further example, this time period may also be adjustable and is normally set for about 4 to 6 cycles at 60 Hz.

Although conduction monitors 28A,28B,28C are disclosed, any suitable circuit (e.g., without limitation, blown fuse indicator contacts; circuit interrupter auxiliary contacts), which detects an open circuit condition of the circuit interrupter fuses or contacts, such as 10A,10B,10C, may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A controlled rectifier bridge for converting a plurality of alternating current voltages from a plurality of alternating current phases to a voltage, each of said alternating current phases having a positive polarity and a negative polarity, said controlled rectifier bridge comprising:

a plurality of segments, each of said segments having an element responsive to a control signal;

an output having said voltage, a first current and a second current;

at least one sensor providing at least one sensed current value from the first current or the second current of said output;

means for determining if the at least one sensed current value is greater than a predetermined value;

means for outputting the control signals to said segments in order to control current conduction within said segments; and for each of said alternating current phases:
an input electrically interconnected with a corresponding one of said alternating current phases,
a circuit interrupter electrically connected in series with said input,
a first one of said segments for the positive polarity of the corresponding one of said alternating current phases,
a second one of said segments for the negative polarity of the corresponding one of said alternating current phases, said second one of said segments for the negative polarity of the corresponding one of said alternating current phases in series with said first one of said segments for the positive polarity of the corresponding one of said alternating current phases,
means for determining if the circuit interrupter is open or if current is not flowing between the input and the corresponding one of said alternating current phases, and
means for disabling the control signals to said first one and said second one of said segments when the at least one sensed current value is greater than the predetermined value, and when the circuit interrupter is open or when current is not flowing between the input and the corresponding one of said alternating current phases.

2. The controlled rectifier bridge of claim 1 wherein said element is a semiconductor device.

3. The controlled rectifier bridge of claim 2 wherein said semiconductor device is a thyristor or SCR.

4. The controlled rectifier bridge of claim 1 wherein said voltage of said output is a direct current voltage.

5. The controlled rectifier bridge of claim 1 wherein said first current equals said second current; and wherein said at least one sensor is a sensor providing a sensed current value from the first current or the second current of said output.

6. The controlled rectifier bridge of claim 1 wherein said first current is different from said second current; and wherein said at least one sensor is a pair of sensors providing a pair of sensed current values from the first current and the second current of said output.

7. A method for controlling a rectifier bridge to convert a plurality of alternating current voltages from a plurality of alternating current phases to a voltage, each of said alternating current phases having a positive polarity and a negative polarity, said rectifier bridge including a plurality of segments, each of said segments having an element responsive to a control signal, said rectifier bridge also including an output having said voltage, a first current, a second current, and, for each of said alternating current phases, an input electrically interconnected with a corresponding one of said alternating current phases, a circuit interrupter electrically connected in series with said input, a first one of said segments for the positive polarity of the corresponding one of said alternating current phases, and a second one of said segments for the negative polarity of the corresponding one of said alternating current phases, said second one of said segments for the negative polarity of the corresponding one of said alternating current phases in series with said first one of said segments for the positive polarity of the corresponding one of said alternating current phases, said method comprising:

sensing at least one sensed current value from the first current or the second current of said output;
determining if the at least one sensed current value is greater than a predetermined value;
outputting the control signals to said segments in order to control current conduction within said segments;
determining if one of the circuit interrupters is open or if current is not flowing between the input and the corresponding one of said alternating current phases; and
disabling the control signals to said first one and said second one of said segments responsive to: (a) the at least one sensed current value being greater than the predetermined value, and (b) said one of the circuit interrupters is open or current is not flowing between the input and the corresponding one of said alternating current phases.

8. The method as recited in claim 7 further comprising employing said first current equal to said second current; and
providing a sensed current value from the first current or the second current of said output.

9. The method as recited in claim 7 further comprising employing said first current different from said second current;
providing a first sensed current value from the first current; and
providing a second sensed current value from the second current.

10. A control system comprising:
a first rectifier bridge;
a second rectifier bridge;
a circuit controlling said first and second rectifier bridges;
each of said first and second rectifier bridges converting a plurality of alternating current voltages from a plurality of alternating current phases to a voltage, each of said alternating current phases having a positive polarity and a negative polarity, each of said first and second rectifier bridges comprising:
a plurality of segments, each of said segments having an element responsive to a control signal;
an output having said voltage, a first current and a second current;
a first sensor providing a first sensed current value from the first current,
a second sensor providing a second sensed current value from the second current,
means for determining if the first sensed current value or the second sensed current value is greater than a predetermined value;
means for outputting the control signals to said segments in order to control current conduction within said segments; and
for each of said alternating current phases:
an input electrically interconnected with a corresponding one of said alternating current phases,
a circuit interrupter electrically connected in series with said input,
a first one of said segments for the positive polarity of the corresponding one of said alternating current phases,
a second one of said segments for the negative polarity of the corresponding one of said alternating current phases, said second one of said segments for the negative polarity of the corresponding one of said alternating current phases in series with said first one of said segments for the positive polarity of the corresponding one of said alternating current phases, means for determining if the circuit interrupter is open or if current is not flowing between the input and the corresponding one of said alternating current phases, and means for disabling the control signals to said first one and said second one of said segments when the first sensed current value or the second sensed current value is greater than the predetermined value, and when the circuit interrupter is open or when current is not flowing between the input and the corresponding one of said alternating current phases.

11. The control system of claim 10 wherein said element is a semiconductor device.

12. The control system of claim 11 wherein said semiconductor device is a thyristor or SCR.

13. The control system of claim 10 wherein said voltage of said output is a direct current voltage.

14. The control system of claim 10 wherein said first current equals said second current; and wherein said at least one sensor is a sensor providing a sensed current value from the first current or the second current of said output.

15. The control system of claim 10 wherein said first current is different from said second current; and wherein said at least one sensor is a pair of sensors providing a pair of sensed current values from the first current and the second current of said output.

* * * * *